United States Patent Office 3,287,309
Patented Nov. 22, 1966

3,287,309
PROCESS FOR INCORPORATING ADDITIVES
Costas H. Basdekis, Longmeadow, and Ronald H. Dahms and Wesley E. Gould, Jr., Springfield, Mass., assignors to Monsanto Company, a corporation of Delaware
No Drawing. Filed Mar. 13, 1963, Ser. No. 264,775
14 Claims. (Cl. 260—34.2)

This invention relates to a method of incorporating liquid additives into certain solid, thermoplastic polymers and more particularly relates to an economical method of incorporating the liquid additives so as to form dry, easily-processed compositions having the liquid additives uniformly dispersed therein.

In preparing solid, thermoplastic polymers for consumer use, it is conventional to incorporate various additives such as plasticizers, lubricants, flame retardants, pneumatogens, etc., some of which are liquid materials. Heretofore, the incorporation of liquid additives into polymers has presented problems because of the difficulty of achieving a uniform dispersion of the liquid additives in the solid polymers without using special, expensive equipment and because of the relatively low limitations on the amount of liquid additive which can be incorporated when this special equipment is used. Thus, the incorporation of liquid additives has previously required the use of expensive equipment or has resulted in the formation of compositions in which the additives were poorly dispersed and which were wet and difficult to process.

An object of the invention is to provide a novel process for incorporating liquid additives into certain solid, thermoplastic polymers.

Another object is to provide an economical process for incorporating these liquid additives so as to prepare dry, easily-processed compositions having the liquid additives uniformly dispersed therein.

These and other objects are attained by incorporating a liquid additive into a solid, thermoplastic polymer of a monomer of the group consisting of an olefin, a monovinylidene aromatic hydrocarbon, an arhalo monovinylidene aromatic hydrocarbon, an alkyl acrylate, an alkyl methacrylate, acrylonitrile, methacrylonitrile, and mixtures thereof by a concentrate technique which comprises premixing the liquid additive with a solid, thermoplastic, polymeric drier at a temperature above the melting temperature of the drier and below the decomposition temperature of the liquid additive to form a concentrate solution containing about 40–65% by weight of the liquid additive, cooling to solidify the concentrate, and blending the solidified concentrate with the solid, thermoplastic polymer. The drier is a polymer which is compatible with the solid, thermoplastic polymer, advantageously a polymer which has substantially the same chemical composition as the solid, thermoplastic polymer.

The following examples are given to illustrate the invention and are not intended as a limitation thereof. Unless otherwise specified, quantities mentioned are quantities by weight.

EXAMPLE I

*Part A—Control*

Mix tris(2,3-dibromopropyl) phosphate and a polyethylene glycol with a commercial polystyrene having a Staudinger average molecular weight of about 58,000 to form a composition containing about 6% tris(2,3-dibromopropyl) phosphate and about 1% polyethylene glycol. The composition is visibly wet and cannot be extruded because of hopper packing and slippage or blocking on the extruder screw.

*Part B*

Heat 60 parts of tris(2,3-dibromopropyl) phosphate to 130° C. Add 40 parts of a commercial polystyrene having a Staudinger average molecular weight of about 10,600 over a period of about 11 minutes, maintaining the temperature at 130–140° C. and agitating during the addition. Then heat at 140–150° C. for an additional 2 minutes to form a solution of polystyrene in tris(2,3-dibromopropyl) phosphate. Cool the solution to form a solid, brittle concentrate, granulate the concentrate, and mix it with a polyethylene glycol and a commercial polystyrene having a Staudinger average molecular weight of about 58,000 to form a composition containing about 6% tris(2,3-dibromopropyl) phosphate and about 1% polyethylene glycol. The composition is dry, has the tris(2,3-dibromopropyl) phosphate uniformly dispersed therein, and extrudes easily.

EXAMPLE II

*Part A—Control*

Mix bis(2-bromoethyl) 2-chloroethyl phosphate with a commercial polystyrene having a Staudinger average molecular weight of about 60,000 to form a composition containing about 5.5% bis(2-bromoethyl) 2-chloroethyl phosphate. The composition is visibly wet and cannot be extruded because of hopper packing and slippage or blocking on the extruder screw.

*Part B*

Heat 55 parts of bis(2-bromoethyl) 2-chloroethyl phosphate to 140° C. Add 45 parts of a commercial polystyrene having a Staudinger average molecular weight of about 10,600 over a period of 16 minutes, maintaining the temperature at 140° C. and agitating during the addition. Then heat at 140–150° C. for an additional 5 minutes to form a solution of polystyrene in bis(2-bromoethyl) 2-chloroethyl phosphate. Cool the solution to form a solid, brittle concentrate, granulate the concentrate, and mix it with a commercial polystyrene having a Staudinger average molecular weight of about 60,000 to form a composition containing about 5.5% bis(2-bromoethyl) 2-chloroethyl phosphate. The composition is dry, has the bis(2-bromoethyl) 2-chloroethyl phosphate uniformly dispersed therein, and extrudes easily.

EXAMPLE III

*Part A—Control*

Mix tris(2,3-dibromopropyl) phosphate with a commercial rubber-modified polystyrene containing about 6.5% of a rubbery butadiene-styrene (75:25) copolymer to form a composition containing about 5.7% tris(2,3-dibromopropyl) phosphate. The composition is visibly wet and cannot be extruded because of hopper packing and slippage or blocking on the extruder screw.

*Part B*

Heat 60 parts of tris(2,3-dibromopropyl) phosphate to 130° C. Add 40 parts of a commercial polystyrene having a Staudinger average molecular weight of about 10,600 over a period of about 13 minutes, maintaining the temperature at 130–140° C. and agitating during the addition. Then heat at 140–150° C. for an additional 5 minutes to form a solution of polystyrene in tris(2,3-dibromopropyl) phosphate. Cool the solution to form a solid, brittle concentrate, granulate the concentrate, and mix it with a commercial rubber-modified polystyrene containing about 6.5% of a rubbery butadiene-styrene (75:25) copolymer to form a composition containing about 5.7% tri(2,3-dibromopropyl) phosphate. The composition is dry, has the tri(2,3-dibromopropyl) phosphate uniformly dispersed therein, and extrudes easily.

Dry, easily-processed compositions having a liquid additive uniformly dispersed therein are also obtained when other liquid additives, e.g., lubricants such as mineral oils, butyl stearate, etc.; plasticizers such as dibutyl phthalate, etc.; pneumatogens such as the pentanes, hexanes, heptanes, etc., are incorporated into solid, thermoplastic polymers such as polystyrene, styrene-acrylonitrile copolymers, styrene-alpha-methylstyrene copolymers, styrene-methyl methacrylate copolymers, styrene-alpha-methylstyrene-acrylonitrile terpolymers, poly-p-t-butylstyrene, polyethylene, polyacrylonitrile, polymethyl methacrylate, etc., via concentrates containing 40–65% by weight of the liquid additive and 60–35% by weight of a solid, thermoplastic, polymeric drier which is compatible with the polymer to be modified. When the drier has the same chemical composition as the solid, thermoplastic polymer, the compositions are optically clear. Higher temperatures, more vigorous agitation conditions and/or longer mixing times are employed in preparing the concentrate solutions when the driers being used have higher molecular weights than the drier of Examples I–III, e.g., when a portion of a higher molecular weight polymer which is to be modified by the liquid additive is employed as the drier in preparing the concentrate solution.

The polymers into which liquid additives are incorporated in the practice of the invention are polymers of one or more monomers of the group consisting of olefins (e.g., ethylene, propylene, butylene, etc.), monovinylidene aromatic hydrocarbons (e.g., styrene; ar-alkylstyrenes such as the o-, m-, and p-methylstyrenes, 2,4-dimethylstyrene, ar-ethylstyrenes, p-t-butylstyrene, etc.; alpha-alkylstyrenes such as alpha-methylstyrene, alpha-ethylstyrene, alpha-methyl-p-methylstyrene, etc.; vinyl naphthalene; etc.), ar-halo monovinylidene aromatic hydrocarbons (e.g., the o-, m-, and p-chlorostyrenes, p-bromostyrene, 2-chloro-4-methylstyrene, etc.), alkyl (meth)acrylates (e.g., methyl (meth)acrylate, ethyl (meth)acrylate, propyl (meth)acrylate, butyl (meth)acrylate, 2-ethylhexyl (meth)acrylates, etc.), acrylonitrile, and methacrylonitrile, including interpolymers of one or more of such monomers with up to an equal amount by weight of one or more copolymerizable monomers, e.g., conjugated dienes such as butadiene, isoprene, etc.; dialkyl maleates such as diethyl maleate, etc.; dialkyl fumarates such as dibutyl fumarate, etc.; unsaturated amides such as acrylamide, N-butyl acrylamide, methacrylamide, etc.

A preferred embodiment of the invention is its application to the incorporation of liquid additives into polymers of monovinylidene aromatic hydrocarbons and/or ar-halo monovinylidene aromatic hydrocarbons, particularly the molding-grade polymers having Staudinger average molecular weights above about 50,000. These polymers contain at least 5%, preferably at least 50% by weight of combined monovinylidene aromatic hydrocarbon and/or ar-halo monovinylidene aromatic hydrocarbon, up to 95% by weight of one or more combined comonomers such as an alkyl (meth)acrylate, acrylonitrile, or methacrylonitrile, and up to 50% by weight of one or more combined comonomers such as a conjugated diene, dialkyl maleate or fumarate, unsaturated amide, etc., and are sometimes modified with a rubbery polymer (usually a diene rubber such as natural rubber, polybutadiene, polyisoprene, a rubbery interpolymer of butadiene and/or isoprene with one or more copolymerizable monomers such as styrene, alpha-methylstyrene, acrylonitrile, methyl methacrylate, etc.). The rubber-modified polymers include compositions obtained by blending a preformed polymer of a monovinylidene aromatic hydrocarbon and/or ar-halo monovinylidene aromatic hydrocarbon with the rubbery polymer and compositions obtained by polymerizing a monovinylidene aromatic hydrocarbon and/or ar-halo monovinylidene aromatic hydrocarbon-containing monomer charge having the rubbery polymer dissolved therein.

Since the problems associated with incorporating liquid additives into solid, thermoplastic polymers arise because of the liquid nature of the additives rather than because of their chemical compositions, and the present solution to these problems is, in effect, simply an improved method of drying the liquid additives prior to incorporating them into the polymers, it will be readily understood that any of the liquid additives which are conventionally incorporated into solid, thermoplastic polymers can be incorporated by the process of the invention. Among the liquid additives most commonly incorporated into these polymers are flame retardants, plasticizers, stabilizers, lubricants, pneumatogens (low boiling liquids which will expand the polymer upon heating to produce a porous structure), etc., e.g., haloalkyl phosphate flame retardants such as tris(2,3-dibromopropyl) phosphate, bis(2-bromomethyl) 2-chloro-ethyl phosphate, etc.; mineral oils; butyl stearate; dibutyl phthalate; lower alkanes such as the pentanes, hexanes, and heptanes, etc.; microcrystalline waxes; carnauba wax; etc. Such additives are ordinarily incoporated in such amounts as to constitute about 2–25% by weight of the compositions.

Any solid, thermoplastic, polymeric material which is compatible with the solid, thermoplastic polymer to be modified and which melts at a temperature below the decomposition temperature of the liquid additive being used can be employed as a drier in the practice of the invention. It is frequently preferred to employ as a drier a material which has substantially the same chemical composition as the polymer to be modified, e.g., a polymer which is identical to the polymer to be modified, a polymer which has the same chemical composition as the polymer to be modified but has a lower molecular weight, or a polymer which differs only slightly in chemical composition from the polymer to be modified. Since, as indicated above, it is usually necessary to employ higher temperatures, more vigorous agitation conditions and/or longer mixing times in preparing the concentrate solutions when the driers have higher molecular weights, it is usually preferred to employ a drier having a comparatively low molecular weight, e.g., a polymer having a Staudinger average molecular weight below about 35,000, preferably below about 15,000.

The liquid additive and polymeric drier are mixed in such proportions that the concentrate solution contains about 40–65%, preferably about 50–60%, by weight of the liquid additive. The particular temperature at which they are mixed to form the concentrate solutions is not critical as long as it is higher than the melting temperature of the drier and lower than the decomposition temperature of the liquid additive. Naturally, dissolution is accomplished more quickly at the higher temperatures and under the more vigorous agitation conditions. When the additive and drier have been mixed sufficiently for dissolution to have been accomplished, the concentrate solution is cooled to form a brittle solid which is easily particulated, e.g., powdered or granulated, to a particle size suitable for intimate admixture with the solid, thermoplastic polymer which is to be modified. The solid concentrate is then readily blended with the solid, thermoplastic polymer to form a dry, easily-processed composition having the desired amount of liquid additive intimately dispersed therein.

The invention is advantageous as an economical means of incorporating liquid additives into certain solid, thermoplastic polymers so as to prepare dry, easily-processed compositions having the liquid additives uniformly dispersed therein. It is particularly advantageous as a means of preparing dry, easily-processed styrene-type polymers having liquid additives such as haloalkyl phosphate flame retardants intimately dispersed therein.

It is obvious that many variations can be made in the products and processes set forth above without departing from the spirit and scope of this invention.

What is claimed is:

1. In a process for incorporating a liquid additive into a solid, thermoplastic polymer of a monomer of the group consisting of an olefin, a monovinylidene aromatic hydrocarbon, an ar-halo monovinylidene aromatic hydrocarbon, an alkyl acrylate, an alkyl methacrylate, acrylonitrile, methacrylonitrile, and mixtures thereof, the steps comprising: mixing a liquid organic additive selected from the group consisting of lubricants, plasticizers, pneumatogens, flame retardants and stabilizers for the polymer with a normally solid, thermoplastic, polymeric drier having a Staudinger average molecular weight below about 35,000, said mixing being conducted at a temperature above the melting temperature of the drier and below the decomposition temperature of the liquid additive and the amounts of the components being selected to form a concentrate solution containing about 40 to 65 per cent by weight of the liquid additive; cooling the concentrate solution to form a solid; particulating said solid concentrate; and blending said particulated concentrate with the solid thermoplastic polymer, said liquid additive being compatible with the solid thermoplastic polymer, and said polymeric drier being a polymer which is compatible with the solid thermoplastic polymer and of lower molecular weight than said solid thermoplastic polymer.

2. The process of claim 1 wherein the liquid additive is a flame retardant.

3. The process of claim 1 wherein the liquid additive is a lubricant.

4. The process of claim 1 wherein the liquid additive is a pneumatogen.

5. The process of claim 1 wherein the liquid additive is a plasticizer.

6. The process of claim 1 wherein the solid, thermoplastic polymer is polystyrene.

7. The process of claim 1 wherein the solid, thermoplastic polymer is a styrene-acrylonitrile copolymer.

8. The process of claim 1 wherein the solid, thermoplastic polymer is a styrene-alphamethylstyrene-acrylonitrile terpolymer.

9. The process of claim 1 wherein the solid, thermoplastic polymer is a rubber-modified polystyrene.

10. The process of claim 1 wherein the solid, thermoplastic polymer is a rubber-modified styrene-acrylonitrile copolymer.

11. The process of claim 1 wherein the drier has substantially the same chemical composition as the solid, thermoplastic polymer.

12. The process of claim 1 wherein both the solid, thermoplastic polymer and the drier are polymers of a monovinylidene aromatic hydrocarbon, the solid, thermoplastic polymer having a Staudinger average molecular weight above about 50,000.

13. A process for incorporating a liquid haloalkyl phosphate flame retardant into a solid polystyrene having a Staudinger average molecular weight above about 50,000, which process comprises mixing the liquid flame retardant with a solid polystyrene having a Staudinger average molecular weight below about 15,000 at a temperature above the melting temperature of the polystyrene and below the decomposition temperature of the liquid flame retardant to form a concentrate solution containing about 50–60% by weight of the flame retardant, cooling the concentrate solution to form a solid, particulating said solid concentrate, and blending the particulated concentrate with the solid polystyrene having a Staudinger average molecular weight above about 50,000.

14. A process for incorporating a liquid haloalkyl phosphate flame retardant into a solid rubber-modified polystyrene which comprises mixing the liquid flame retardant with a solid polystyrene having a Staudinger average molecular weight below about 15,000 at a temperature above the melting temperature of the polystyrene and below the decomposition temperature of the liquid flame retardant to form a concentrate solution containing about 50–60% by weight of the flame retardant, cooling the concentrate solution to form a solid, particulating said solid concentrate, and blending the particulated concentrate with the solid rubber-modified polystyrene.

References Cited by the Examiner

UNITED STATES PATENTS

| | | | |
|---|---|---|---|
| 2,454,851 | 11/1948 | Warner et al. | 260—34.2 |
| 3,058,926 | 10/1962 | Eichhorn. | |
| 3,062,758 | 11/1962 | Rainer et al. | 260—34.2 |
| 3,176,021 | 3/1965 | Volungis et al. | 260—34.2 |

FOREIGN PATENTS 654,477   6/1951   Great Britain.

MORRIS LIEBMAN, *Primary Examiner.*

B. A. AMERNICK, *Assistant Examiner.*